United States Patent
Hinkel et al.

[11] Patent Number: 5,934,426
[45] Date of Patent: Aug. 10, 1999

[54] LOCKUP CLUTCH WITH A TORSIONAL VIBRATION DAMPER

[75] Inventors: Rüdiger Hinkel, Röthlein-Heidenfeld; Uwe Dehrmann, Würzburg; Roland Illig, Heustreau; Horst Breier, Dittelbrunn, all of Germany

[73] Assignee: Mannesmann Sachs AG, Schweinfurt, Germany

[21] Appl. No.: 09/081,119

[22] Filed: May 19, 1998

[30] Foreign Application Priority Data

May 23, 1997 [DE] Germany .............. 197 21 642

[51] Int. Cl.⁶ .................. F16H 45/02; F16D 3/50
[52] U.S. Cl. .............. 192/3.28; 192/212; 464/67
[58] Field of Search ................ 192/3.28, 3.29, 192/212; 464/66, 67

[56] References Cited

U.S. PATENT DOCUMENTS

| | | | |
|---|---|---|---|
| 4,875,562 | 10/1989 | Fujimoto | 192/3.28 |
| 4,890,706 | 1/1990 | Miura et al. | 192/3.28 |
| 5,211,270 | 5/1993 | Tamura et al. | 192/3.29 |

FOREIGN PATENT DOCUMENTS

| | | |
|---|---|---|
| 41 35 631 | 4/1992 | Germany . |
| 44 23 640 | 6/1995 | Germany . |
| 2 081 401 | 2/1982 | United Kingdom . |
| 2 256 262 | 12/1992 | United Kingdom . |

*Primary Examiner*—Richard M. Lorence
*Attorney, Agent, or Firm*—Cohen, Pontani, Lieberman & Pavane

[57] ABSTRACT

A lockout clutch on a torque converter includes an axially deflectable piston through which torque can be transmitted from the drive side of the torque converter to its output side. The lockout clutch also has a torsional vibration damper having an input part connected to the piston and an output part connected to the turbine wheel of the torque converter. One of the input part and the output part includes a cover element with control elements for energy storage devices acting on the torsional vibration damper on at least one radial support of the cover element. The control elements are designed to project into the cover element with a depth at which the associated energy storage devices rests on a control element along substantially the extension width in the contact area of the control element. The control elements are also designed to avoid penetration to the axial support at least at the point where the other of the input and output elements engages the energy storage elements. This engagement occurs with substantially axial projections, on which axial securing devices to retain the energy storage devices are provided. The axial projection are designed so that pressurization of the energy storage devices is ensured over their entire width in the axial extension direction of the axial projections.

29 Claims, 15 Drawing Sheets

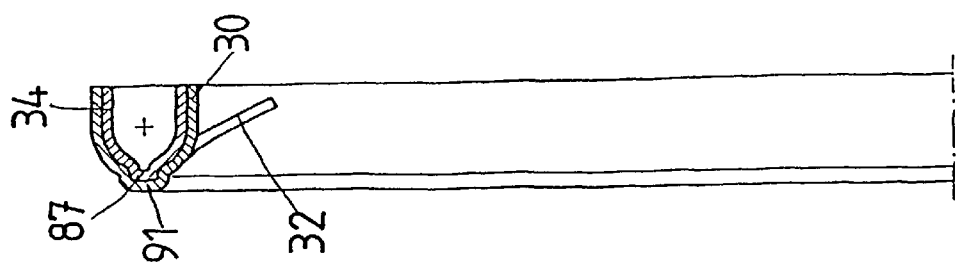
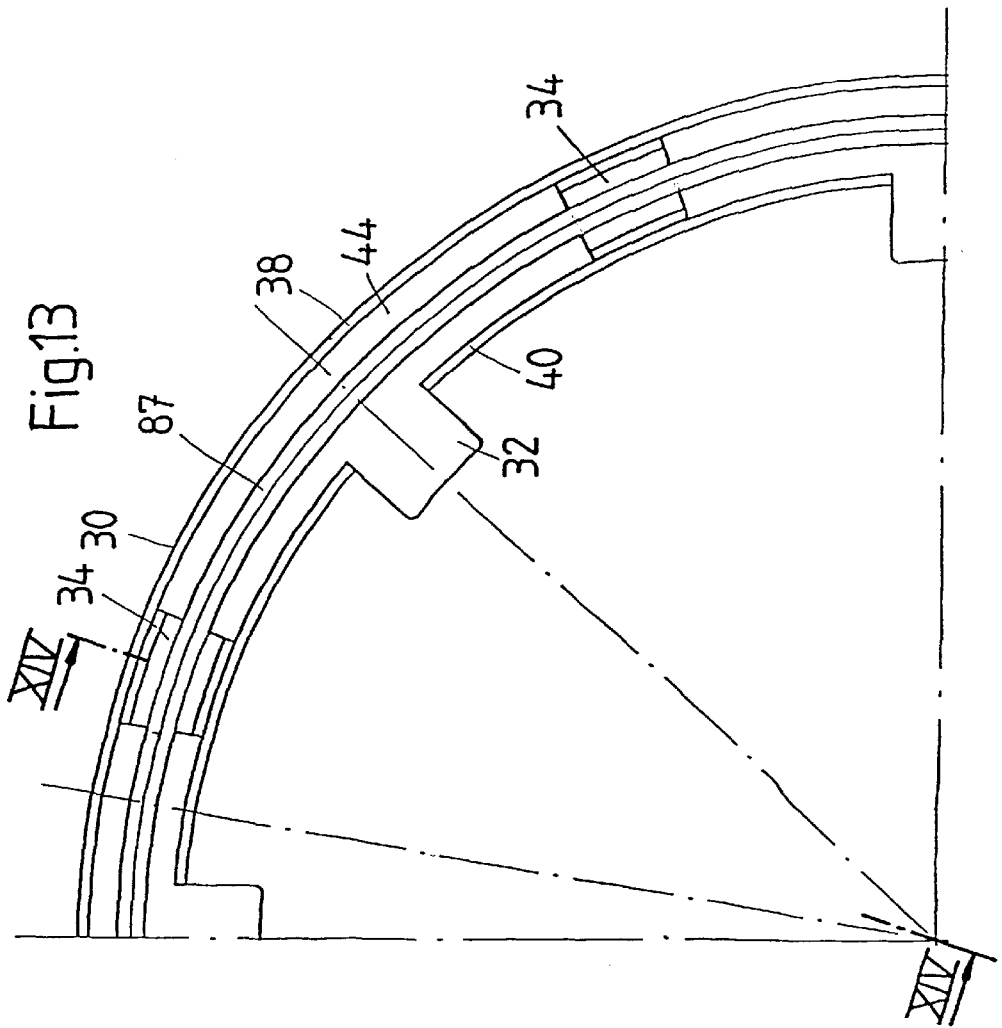

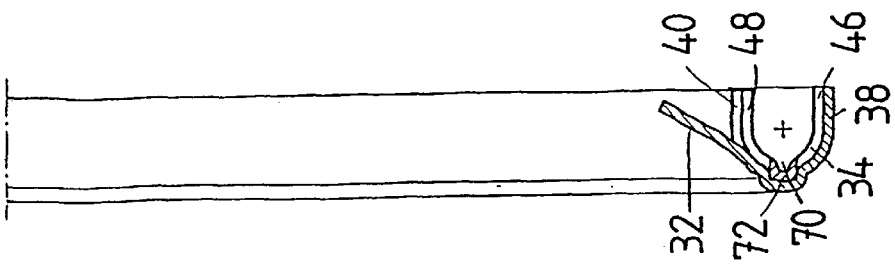
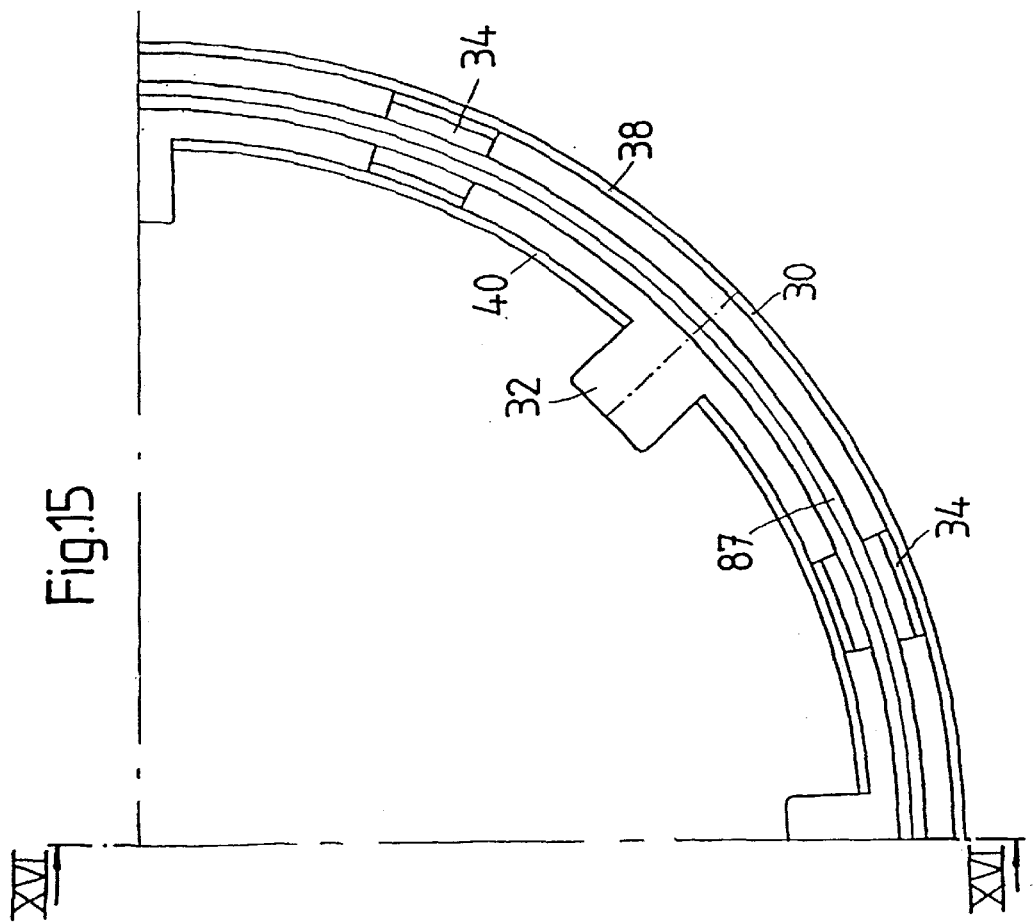

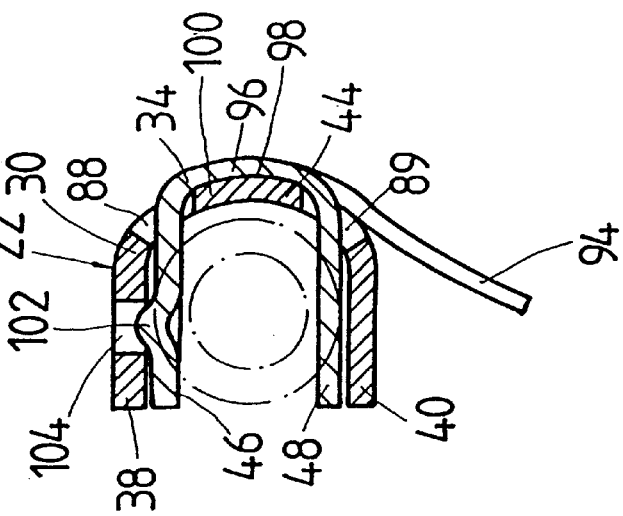
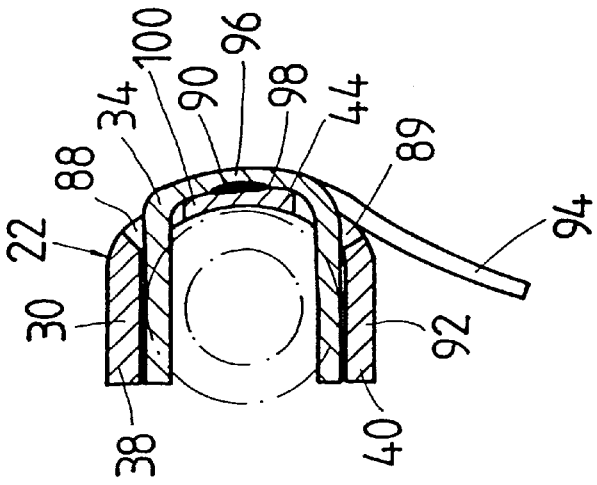
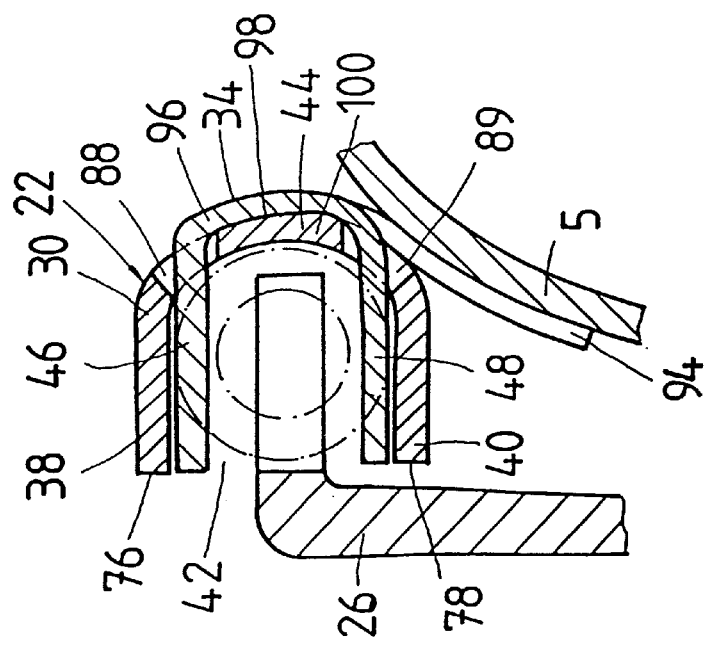

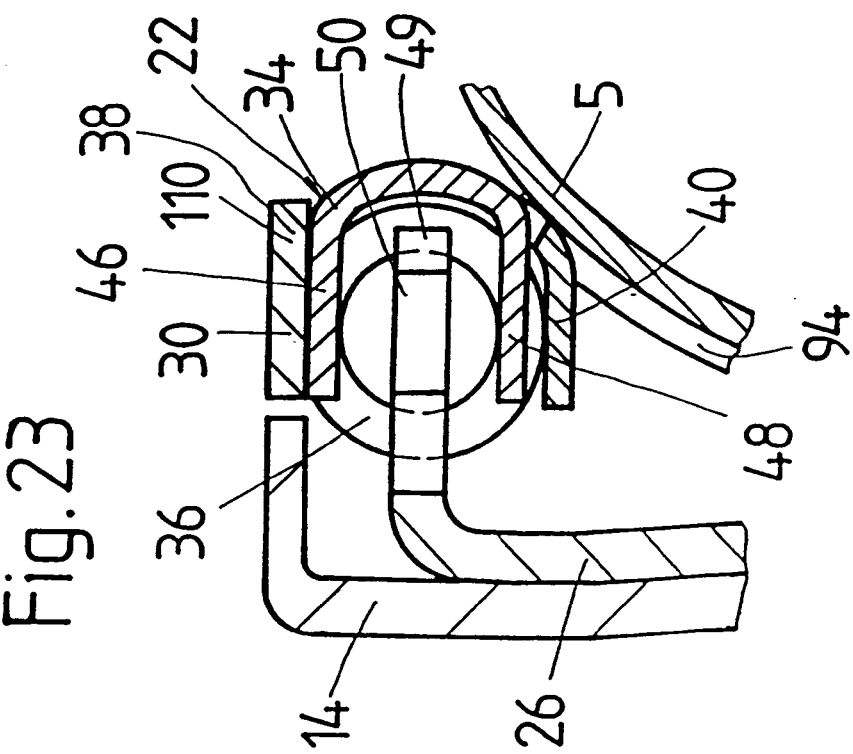
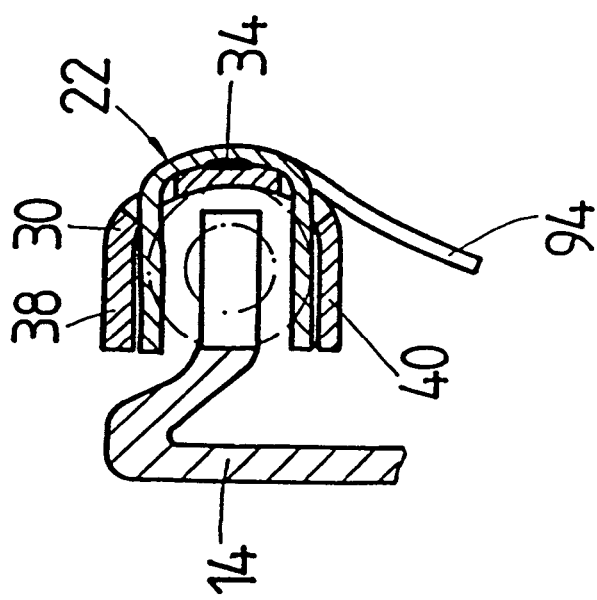

LOCKUP CLUTCH WITH A TORSIONAL VIBRATION DAMPER

BACKGROUND OF THE INVENTION

1. Field of the Invention

The invention relates to a lockup clutch with a torsional vibration damper for use with a torque converter.

2. Description of the Related Art

A prior art lockup clutch having a torsional vibration damper for use with a torque converter is shown in German reference DE 41 35 631 A1. The prior art lockup clutch includes an axially deflectable piston through which torque can be transmitted from a drive side of the torque converter to an output side of the torque converter, which comprises a turbine wheel of the torque converter. The torsional vibration damper includes an input part, and output part, and energy storage devices disposed therebetween. The piston is connected to the input part of a torsional vibration damper which serves as a cover element for the energy storage devices effective between the input and output parts. The input part is open on its side facing the output part of the torsional vibration damper for accommodating the energy storage devices. The energy storage devices are radially secured in the cover element between two radial supports. An axial support that connects the radial supports to each other axially secures the energy storage devices against movements directed toward the piston. The energy storage device region that faces the open side of the cover element can be axially secured by the output part of the torsional vibration damper, whereby the output part penetrates between the radial supports of the cover element with predetermined depth.

The outer radial support has control elements in the form of divided brackets curved toward the energy storage devices. In contrast, the inner support consists of brackets curved out from a section that serves to attach the cover element to the piston. Further control elements for the energy storage devices are curved out from the same section.

A torsional vibration damper embodied on the lockup clutch in this fashion makes optimal use of the axial structural space available between the piston and turbine wheel in the radial outer area. However, because the control elements are separated from the outer radial support, the latter is not strong enough to provide sufficient resistance against the centrifugally-induced radial forces transmitted by the energy storage devices. Therefore, a plastic deformation of the outer radial support of the cover element must therefore be expected. For this reason, a collar encircles the outer radial support on the circumferential area of the piston. The result of this measure is to move the energy storage devices farther radially inward. This is undesired, however, because for transmitting very high torques, the energy storage devices must be arranged in the outermost radial area. Otherwise, the energy storage devices must be embodied in a sufficiently long-stroked fashion to yield the desired damping properties.

To avoid limiting the available space even further, the control elements on the input-side and output-side components of the torsional vibration damper are kept so short that the energy storage devices are not pressurized over their entire width, but only by a smaller area. As a result, the pressure exerted on these small areas of contact on the energy storage device and the control elements is high. Therefore, premature wear results.

SUMMARY OF THE INVENTION

It is an object of the present invention to provide a torsional vibration damper on a lockup clutch with compact axial structure and high torque transmissibility so that pleasant damping behavior and lower risk of wear are ensured.

This object is attained according to the invention with a lockup clutch for a torque converter having a torsional vibration damper mounted between a piston element of the lockup clutch and an output side of the torque converter, wherein the torsional vibration damper comprises an input part and an output part. One of the input part and the output part serves as a cover element having inner and outer radial supports. The cover element has an open end facing the other of the input and output parts and an axial support connecting the radial supports at the opposing axial end. Control elements which project into the cover element from at least one of the inner and outer radial supports cover an entire extension width of the energy storage devices on which they act.

The outer radial support, because it is embodied without interruption in the circumferential direction, provides high deformation resistance against centrifugally-induced radial forces conveyed via the energy storage devices. For this reason, the outer radial support requires neither stiffeners nor support by a collar embodied on the circumference of the piston. Therefore, the energy storage devices may be arranged extremely far radially outward, especially when the cover element that accommodates the energy storage devices acts as an output part of the torsional vibration damper and thus is arranged on the turbine wheel. This arrangement is advantageous because the piston of a lockup clutch usually has a collar of the aforementioned type in the circumferential area for reasons of stability; thus, the cover element can be brought outward into the radial area of this collar. The result is high moment transmissibility with correspondingly long-stroked energy storage devices. Naturally, in such an embodiment, the component that engages into the cover element and, at the other end, pressurizes the energy storage devices, embodied as a hub disk, for example, acts as the input-side component of the torsional vibration damper and is therefore attached to the piston.

Given the uninterrupted course of the outer radial support in the circumferential direction, it is advantageous for control elements that control the energy storage devices to run, starting from the open side of the cover element, in the direction of an axial support that connects the radial supports to each other. The control elements are thereby designed to have projections extending deeply into the cover element, so that the associated energy storage devices rest along their entire extension width in a contact area of the control element. The projections avoid penetration to the point where the other component of the torsional vibration damper, which interacts with the cover element via the energy storage devices, engages the energy storage devices. As a result, the energy storage devices are pressurized over a wide area by the control elements, so that relatively low pressure exists at the contact areas between the control elements and the associated ends of the energy storage devices, thereby reducing wear. At the same time, however, despite the very large embodiment of the projections on the control elements, the area where the other component of the torsional vibration damper engages the energy storage devices is kept free. As a result, this other component may also engage into the cover element with a depth equal to at least the diameter of the energy storage devices, and thus also pressurizes the energy storage devices over a wide area. This measure therefore ensures that the area pressure between this other component and the energy storage devices is low, and thus that wear is low as well.

Control elements having large projections of this type that engage into the cover element are realized in various manners. For example, brackets protruding relative to the radial supports may be used which are folded into the cover element by being bent toward the axial support in such a way that, at those points where the brackets bend, the cross-section of the enclosed section of the cover element narrows. This narrowed cross-section is suitable for pressurization of energy storage devices arranged in the circumferential direction between two respective narrowed cross-sections. Preferably, the brackets should be long enough to extend along the radial supports and thus to pressurize the entire associated area of the energy storage devices. At the same time, however, the brackets should be limited in size, protruding only insubstantially into the area of the axial support, thereby allowing the other component of the torsional vibration damper, which engages into the cover element, to extend near the axial support and pressurize the associated area of the energy storage device over its entire width.

Instead of making the control elements with brackets, the control elements may also be inserted into the cover element from its open side. In this embodiment, the control elements have a free space at the closed end for allowing the other component of the input part and output part, that engages into an opening in the axial support of the cover element, to extend across the entire width of the energy storage devices. These control elements are thus placed in the cover element as auxiliary components for the purpose of partially narrowing its cross-section around the circumference and thus permitting pressurization of the energy storage devices. Unlike the brackets discussed above, these control elements are preferably one-piece elements that have a connection point between their two control regions. This connection point would hinder the other component of the torsional vibration damper during penetration into the cover element, for which reason each control element, at least in the area where the other component is to engage, has the free space. The free space is produced, for example, by deep drawing, wherein material on the control element is compressed in one direction, enlarging the distance between this material and the penetrating other component. Such material compression is especially advantageous when the material is compressible into a corresponding opening in the cover element, so that the control element can be attached to the cover element at the same time. To ensure a uniform arrangement of the plurality of control elements in the cover element and, in particular, a uniform penetration depth, the insertion depth is limited by means of a stop. This stop preferably consists of bendings, the free ends of which come to rest on the cover element on its open side. The stops simultaneously connect the individual control elements to each other in the circumferential direction. For this purpose, the stops run as rings, on which the control elements are arranged at a predetermined distance to each other in the circumferential direction. Of course, the individual control elements may be connected to each other at a different location, for example, given a free space of sufficient size, via the latter.

Another way to bring the control elements into the cover element is to provide recesses through the axial support of the cover element. The recesses allow the passage of projections of control elements. In this case, the control elements are brought from the closed side of the cover element, so that the penetration depth of the other component of the torsional vibration damper is clearly not affected by the control elements. In contrast, the cross-section of the passage in the cover element is reduced by the projections, and thus the control surface for the energy storage device is formed in the manner already described. According to the claims, the projections advantageously run substantially parallel to the associated radial support of the cover element. The control elements may be fixedly attached to the cover element via welded points, for example, or in a force-locking or positive-locking configuration. A relative movement between the control elements and the cover element may also be allowed; however, the distance of this relative movement must be limited by suitable stops. The optimal relative position between the two elements will always be established under the effect of the forces applied during operation of the lockup clutch.

In an especially simple embodiment of the cover element, the outer radial support (which, as noted, must be free of interruptions in the circumferential direction) is embodied as a ring and control elements are provided on the inner diameter of the ring. Projections are embodied on the control elements for forming the inner radial support. The strength of the inner radial support is not critical, because practically no centrifugally-induced forces act radially inward.

For attachment of the torsional vibration damper to the turbine wheel, bracket-type formed elements or supports are provided either on the cover element or on the control elements. The bracket-type formed elements are bent toward the turbine wheel and attached thereto. Of course, in the embodiment in which control elements are brought from the open side of the cover element, these formings or supports are preferably embodied on the cover element, in light of its function as the output side component of the torsional vibration damper. In contrast, given the same function of the cover element, it is advantageous in an embodiment in which the control elements penetrate from the turbine wheel side of the axial support to attach the formed elements or supports to the control elements.

To attain an advantageous characteristic of the torsional vibration damper, a plurality of energy storage devices of varying rigidity may be used. According to the claims, between these energy storage devices, which together form a spring set of the torsional vibration damper, there are intermediate elements. The intermediate elements ensure that the energy storage devices, even when separated from the control elements or the other component of the torsional vibration damper, are pressurized with low pressure, in that these intermediate elements pressurize the energy storage devices over a wide area. The intermediate element may comprise a cylinder centered on the energy storage devices, for example, or a ball provided between every two energy storage devices. When a centrifugal-force-dependent friction is desired in the extension area of the energy storage device, these intermediate elements may be brought into friction connection with the outer radial support. Given the demand for low friction, the intermediate elements are preferably no larger than the energy storage devices in outer diameter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Examples of the invention are described below in greater detail in reference to the drawings. In the drawings, wherein like reference designators denote similar elements throughout the several views:

FIG. 13 is an axial view of another embodiment of a cover element with control elements inserted from its open side;

FIG. 14 is a sectional view of the cover element along line XIV—XIV in FIG. 13;

FIG. 15 shows different section of the cover element of FIG. 13;

FIG. 16 is a sectional view of the cover element along line XVI—XVI in FIG. 15;

FIG. 17 shows an embodiment of the cover element with the control elements inserted from the closed side;

FIG. 18 shows another embodiment of the cover element with a weld joint between control elements and cover element;

FIG. 19 shows another embodiment of the cover element with a positive-locking connection between control element and cover element;

FIG. 22 shows another embodiment of the cover element of FIG. 18, but with the piston bent at right angle;

FIG. 23 shows another embodiment of the cover element as a ring encircling the control element;

DETAILED DESCRIPTION OF THE PRESENTLY PREFERRED EMBODIMENTS

Figure 1:
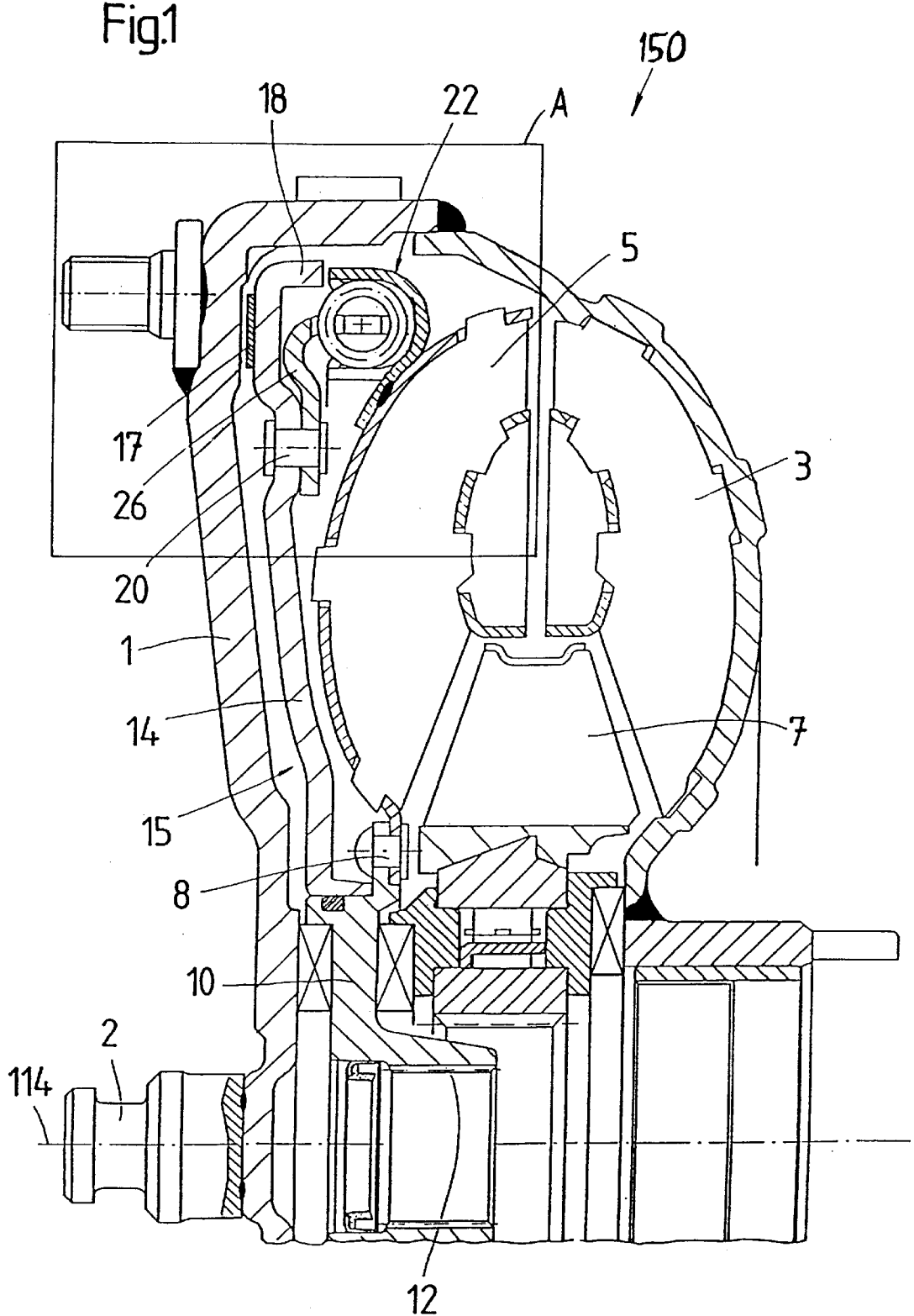
FIG. 1 is a sectional view along a longitudinal axis of an upper half of a torque converter with a lockup clutch according to the invention, which includes a torsional vibration damper.

Referring initially to FIG. 1, a hydrodynamic torque converter 150 comprises a lockup clutch 15 for transmitting torque from the converter housing 1 to an output shaft (not shown). A general description of the torque converter 150 as a whole will not be included in detail because torque converters are known from the prior art, such, for example, as German reference DE 44 23 640 A1, the entirety of which is included herein by reference.

The torque converter 150 in FIG. 1 has a shaft butt end 2 in the area of its central axis 114, via which it can be brought into rotary connection with a drive (not shown), such as the crank shaft of an internal combustion engine. The shaft butt end 2 is connected in a rotation-proof manner via a welded connection to a converter housing 1. The converter housing 1 extends radially outward and accommodates, on the output side, a pump impeller 3. The converter housing 1 also encloses a turbine wheel 5 and a guide wheel 7, which, together with the pump impeller 3, form the hydrodynamic converter circuit. The turbine wheel 5 is connected by a riveted joint 8 to a turbine hub 10, which in turn has an internal toothing 12 for rotation-proof connection to an output shaft (not shown).

A piston 14 of the lockup clutch 15 is arranged on the turbine wheel 5 in an axially movable and rotatable fashion. A radially outer area of the piston 14 carries a friction lining 17 that conveys torque to the piston 14 when brought to rest on the converter housing 1. An outermost circumferential area of the piston 14 has a collar 18 extending axially in the direction of a torsional vibration damper 22 for the purpose of axial stiffening.

Figure 2:
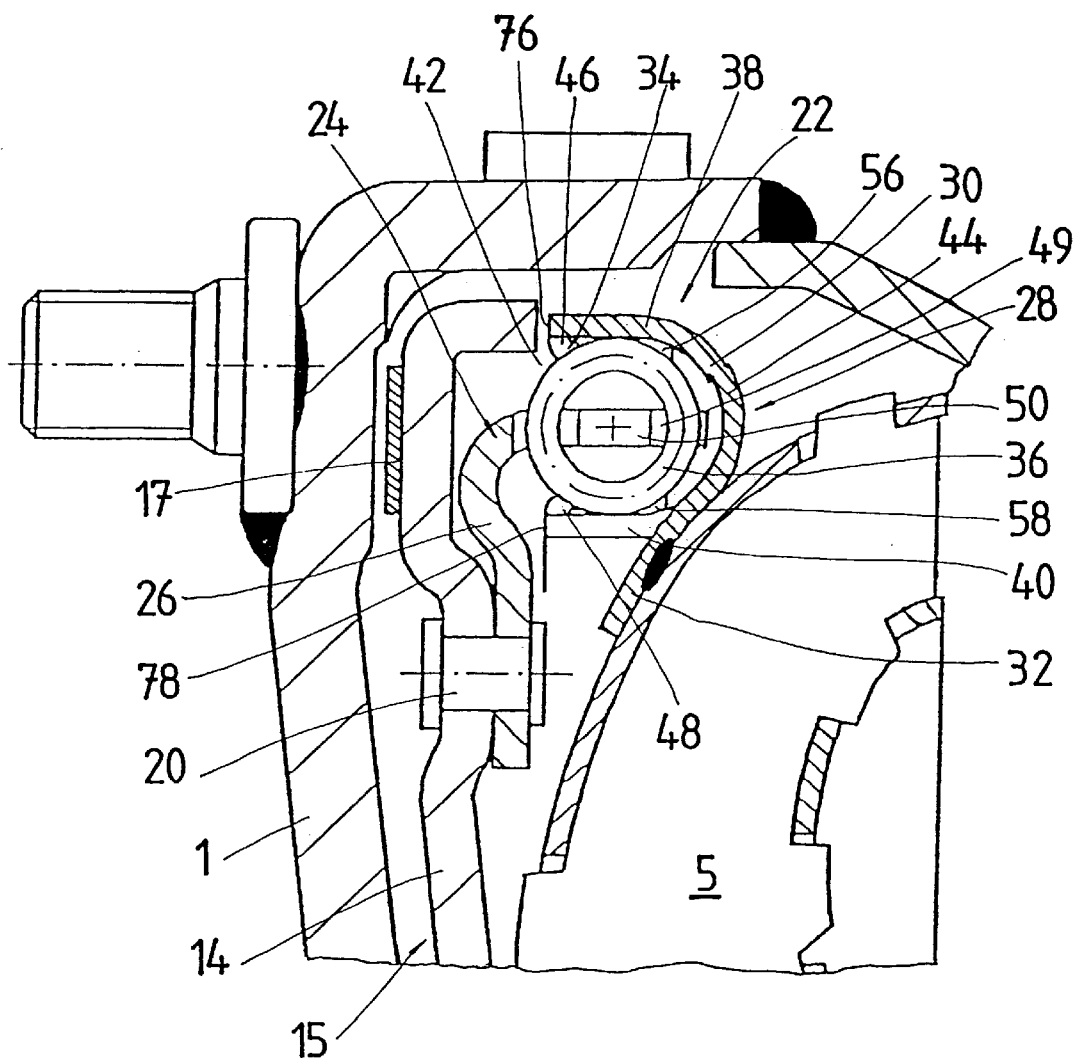
FIG. 2 shows an enlarged detail of the torsional vibration damper in the area A outlined in FIG. 1.
Figure 3:
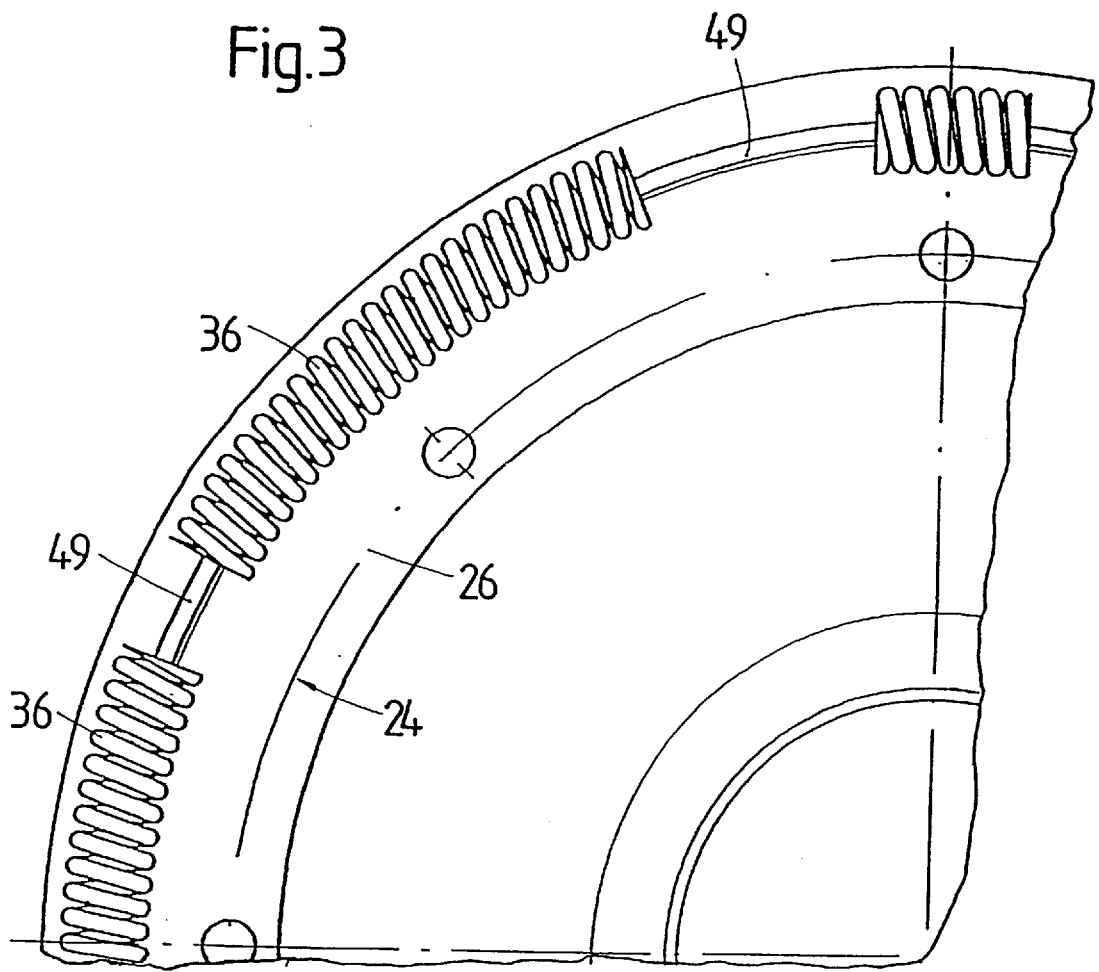
FIG. 3 is a partial view in the axial direction of energy storage devices of the torsional vibration damper.

The torsional vibration damper 22 is shown enlarged in FIG. 2. The torsional vibration damper 22 has an input side component 24 in the form of a hub disk 26, which is attached to the piston 14 by a riveted joint 20. The torsional vibration damper 22 also has an output side component 28 in the form of a cover element 30, which is attached to the turbine wheel 5 via radial formings 32. The cover element 30 includes an outer radial support 38 and an inner radial support 40 arranged with radial offset relative to each other and extend substantially in the axial direction. The radial supports 38 and 40 have free ends 76 and 78 that form an open end 42 of the cover element 30 facing the piston 14. The cover element 30 also has energy storage devices 36 arranged radially between the radial supports 38 and 40. The two radial supports 38 and 40 are connected to each other at their ends facing the turbine wheel 5 by an axial support 44, which is U-shaped in cross-section. The radial formings 32 of the cover element 30 are separated from the inner radial support 40 and, after being bent toward the turbine wheel 5, are welded to the latter.

Control elements 34 are arranged on the sides of the radial supports 38 and 40 facing the energy storage devices 36. These control elements 34 are formed by projections 46, 48 that start from the free ends 76, 78 of the radial supports 38 and 40 and extend substantially parallel to the radial supports 38, 40. In the axial direction, the radial supports 38 and 40 run to close to the axial support 44. To form the projections 46, 48, the cover element 30 initially comprises brackets protruding toward the piston 14 relative to the free ends 76, 78 of the radial supports 38, 40. The brackets are deformed by almost 180° by a bending process and are thereby bent into the cover element 30 until they assume the position in the cover element 30 shown in FIG. 2. The projections 46, 48 thus project radially into the extension area of the energy storage devices 36, so that torque can be transmitted from the energy storage devices through these projections 46, 48 to the cover element 30 and the turbine wheel 5.

Figure 4:
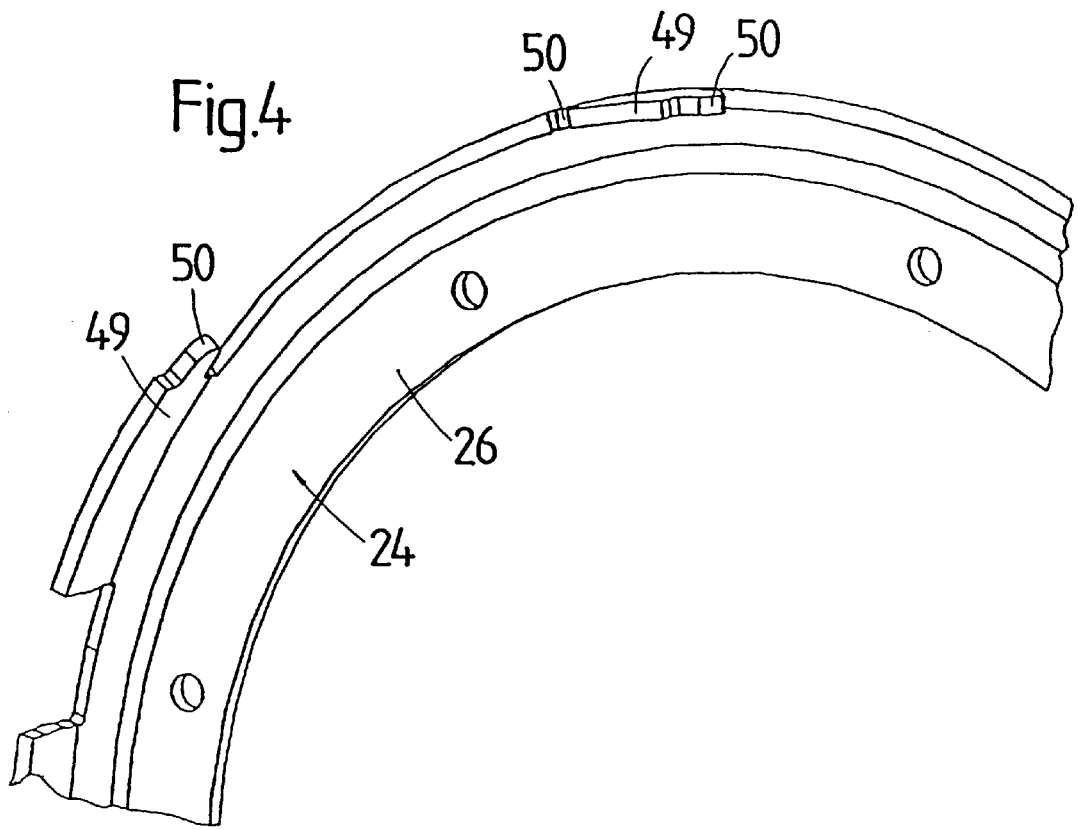
FIG. 4 is a partial view of a hub disk of the torsional vibration damper.
Figure 5:
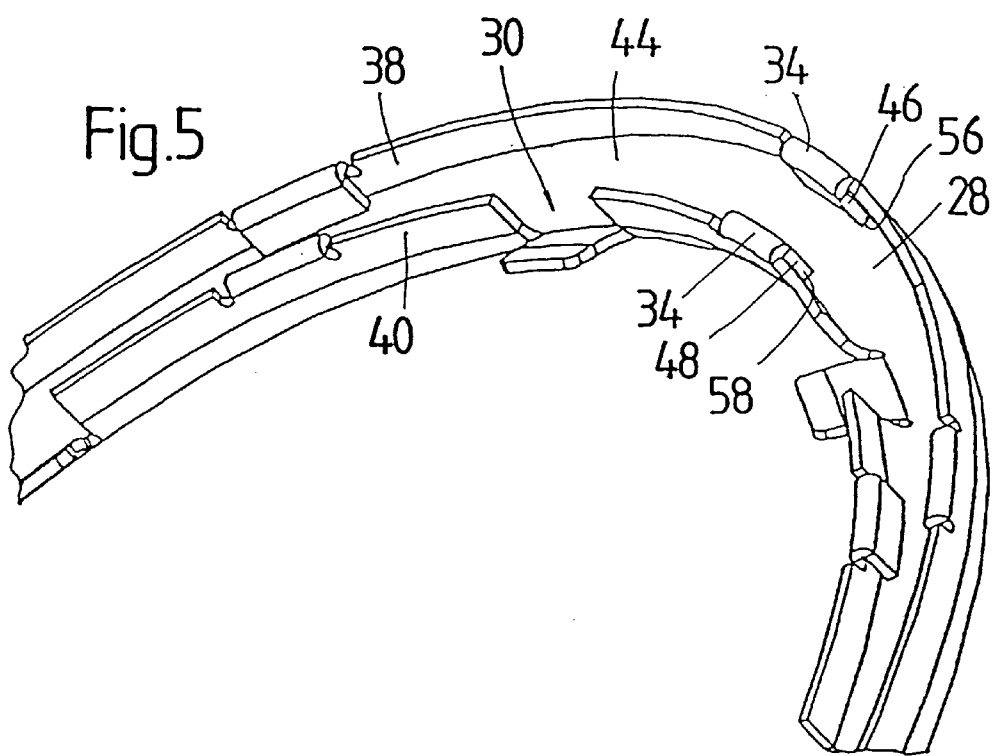
FIG. 5 is a partial view of a cover element of the torsional vibration damper with control elements for the energy storage devices.

The energy storage devices 36 are held on the hub disk 26. The hub disk 26, in its circumferential area, has substantially axial projections 49, which project into the cover element 30 almost to its axial support 44. Referring to FIG. 4, the axial projections 49 comprise axial securing devices 50 for the energy storage devices 36. The axial securing devices 50, starting from the axial projections 49, extend substantially in the circumferential direction and engage radially inside into the energy storage devices 36, which are preferably embodied as helical springs. The energy storage devices 36 are thus secured by the axial securing devices 50 against movements in the axial direction.

When the piston 14 moves axially in the direction of the converter housing 1 to establish the torque connection between the housing 1 and the output shaft, or when the piston 14 moves in the direction of the turbine wheel 5 to release this torque connection, the energy storage devices 36 are able to participate in this piston movement via the axial securing devices 50, and thus can move relative to the radial supports 38, 40 without leaving the cover element 30. It should be mentioned at this point that the energy storage devices 36 are compressed from the drive side by the axial projections 49 of the hub disk 26.

As FIG. 2 makes clear, the radial projections 46 and 48 extend so deeply into the cover element 30 that the entire extension width of the radial engagement area in the energy storage devices 36 is effected. Similarly, the axial projections 49 of the hub disk 26 are drawn so deeply into the cover element 30 that even when these projections 49 act on the largest diameter area of the energy storage devices 36, as in FIG. 2, they pressurize the energy storage device 36 across its full width. In consequence, the energy storage devices 36 are pressurized over a wide area by the hub disk 26 as the input side component of the torsional vibration damper 22 and by the radial projections 46 and 48 of the cover element 30 as the output side component 28 of the torsional vibration damper 22. As a result, low area pressures are applied. The deep engagement of the axial projections 49 is facilitated, among other factors, by the fact that the radial projections 46 and 48 extend only into the transitional area between the radial supports 38 and 40 and the axial support 44, not into the extension area of the axial support. As a result, the axial projection 49 does not contact the axial support of the cover element 30 despite the deep axial penetration of the axial projections 49 of the hub disk 26 into the cover element 30, even when the piston 14 assumes its final position on the turbine-wheel side.

Figure 6:
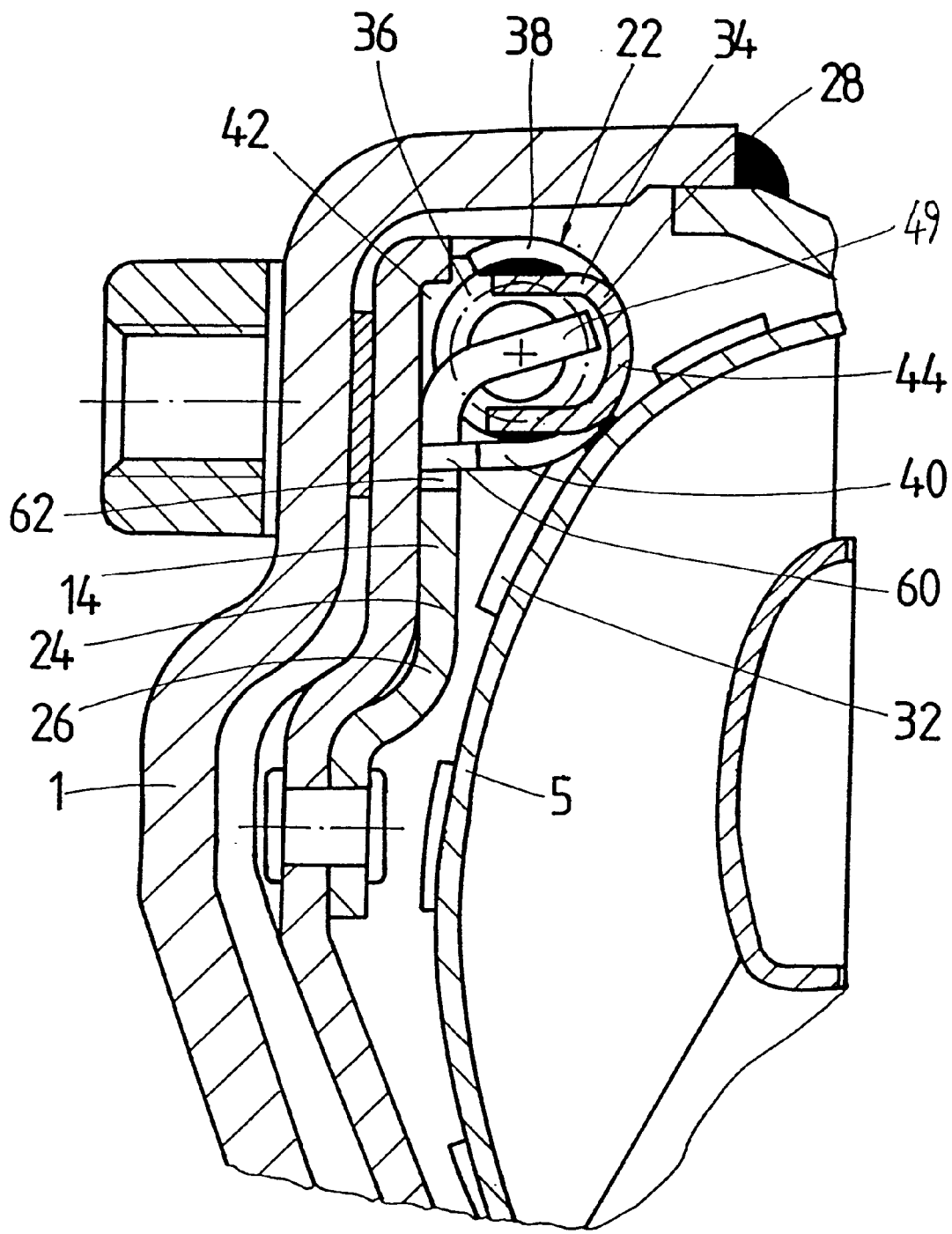
FIG. 6 shows an enlarged view of another embodiment of a vibration damper like FIG. 2, but with a stop on the hub disk to limit the rotational angle between the hub disk and the cover element.

The torsional vibration damper 22 in FIG. 6 corresponds substantially to that in FIG. 2. However, in FIG. 6, the axial projections 49 are drawn farther radially inward. A recess 62 is arranged between each two axial projections 49 in the circumferential direction for the engagement of an extension 60 on the inner radial support 40 with predetermined clearance in the circumferential direction. As a result, a rotational angle limit is established between the hub disk 26 as the input side component 24 of the torsional vibration damper 22 and an output side component 28 (which corresponds with the cover element 30 of FIGS. 1 and 2).

Figure 7:
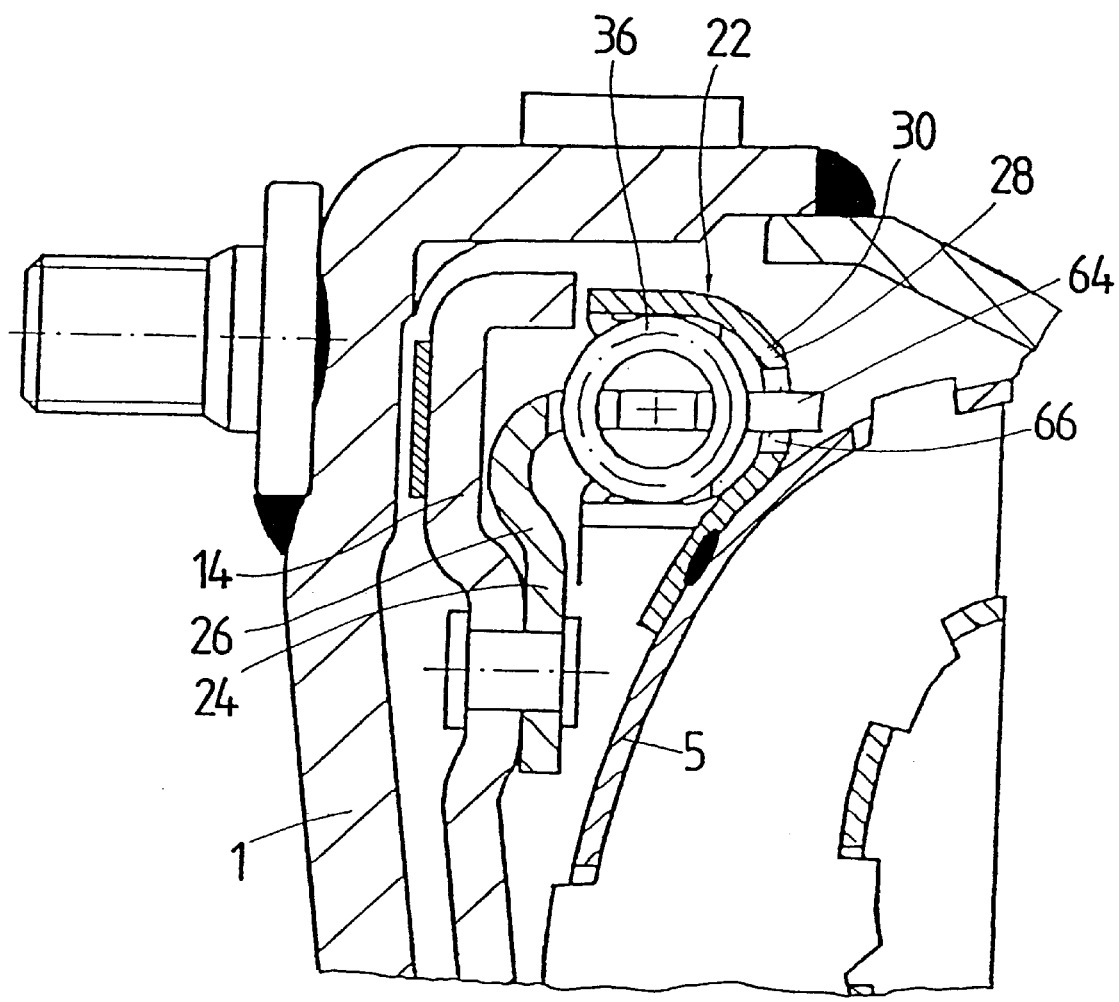
FIG. 7 shows another embodiment of a vibration damper like that shown in FIG. 6, but with the stop on the cover element.

The same rotational angle limit is included in the embodiment shown in FIG. 7. Here, the cover element 30 has a recess 66 in its axial support 44 for the passage of an extension 64 on the axial projection 49 of the hub disk 26. The extension 64 of the hub disk 26 runs with a circumferential clearance in the recess 66 of the cover element 30. The circumferential clearance provides the rotational angle limit of the input side component 24 relative to the output side component 28 of the torsional vibration damper 22.

Figure 8:
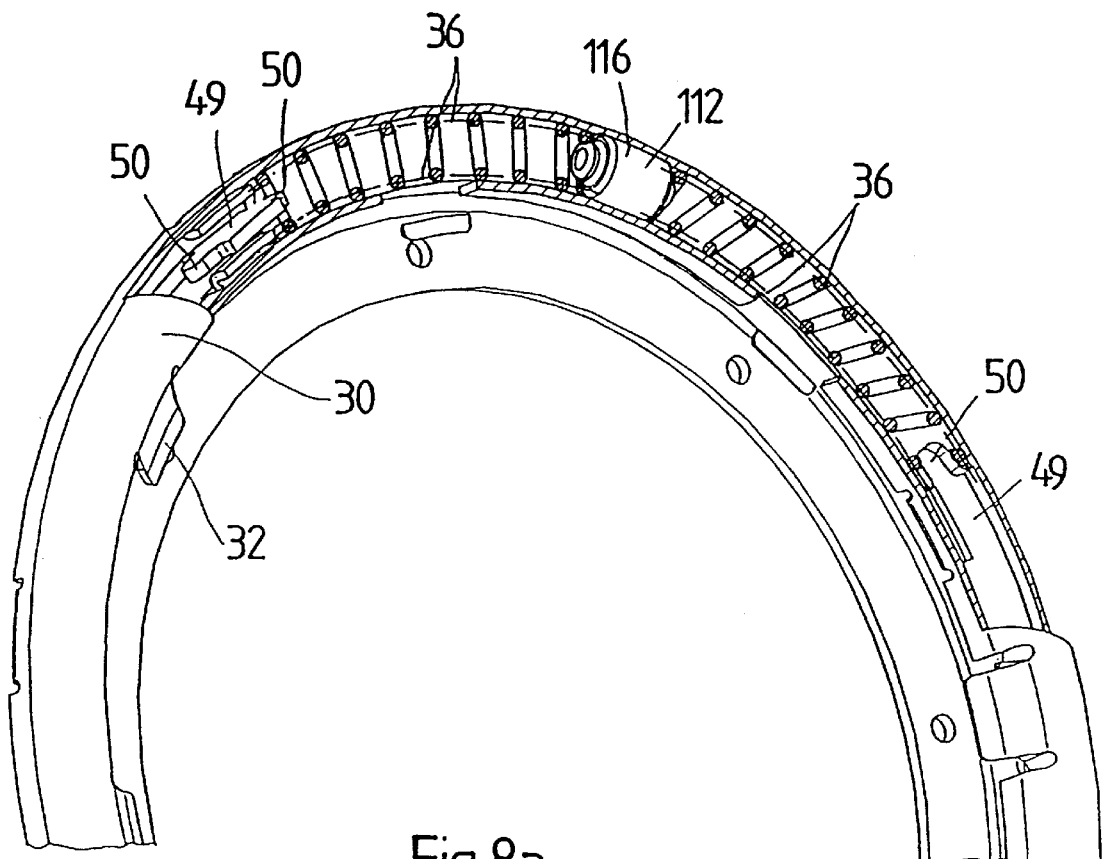
FIG. 8 is a partial view in the axial direction of another embodiment of energy storage devices of the torsional vibration damper with cylinders as intermediate elements between every two energy storage devices.
Figure 8A:
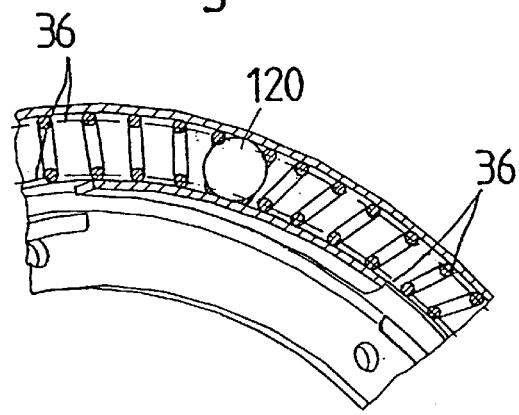
FIG. 8a shows the energy storage elements of FIG. 8 with a ball as an intermediate element.
Figure 10:
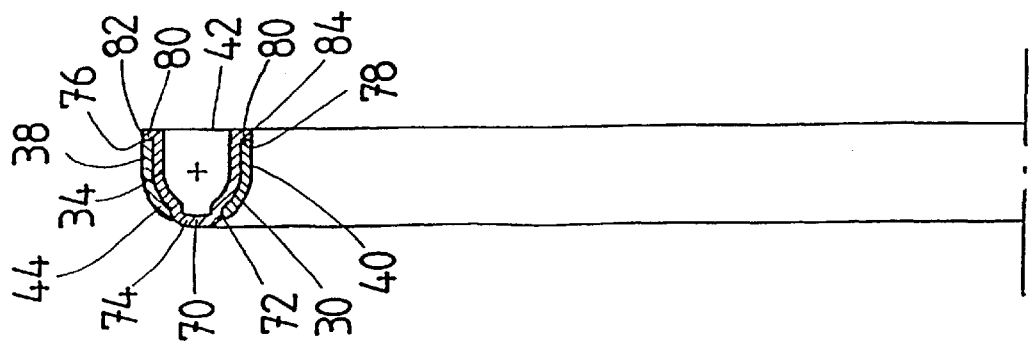
FIG. 10 is a sectional view of the cover element along line X—X in FIG. 9.
Figure 9:
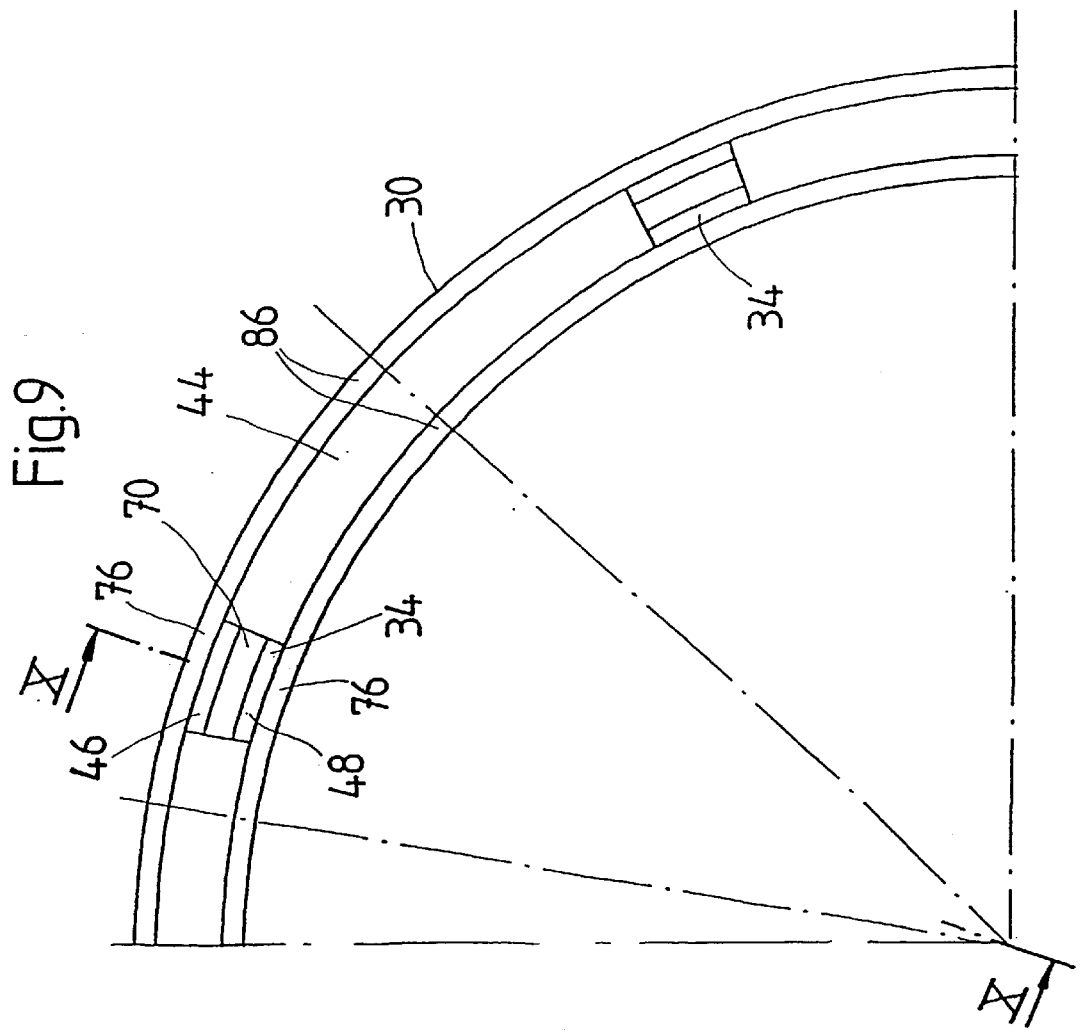
FIG. 9 is an axial view of an embodiment of a cover element with control elements inserted from its open side.
Figure 12:
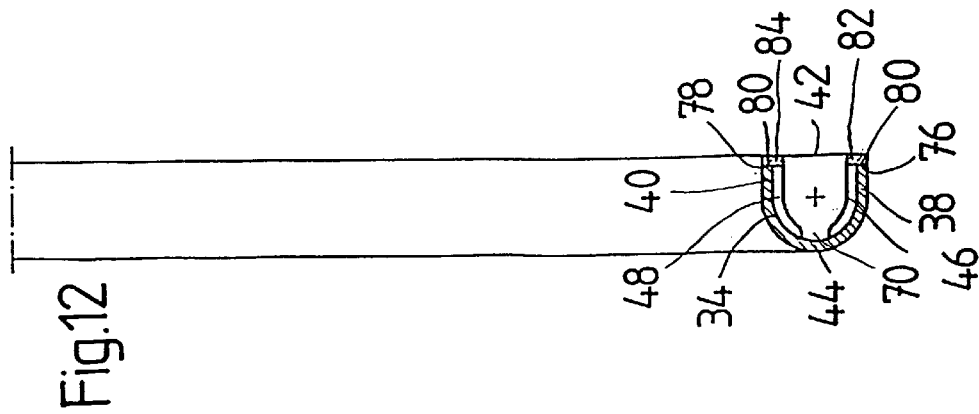
FIG. 12 is a sectional view of the cover element along line XII—XII in FIG. 11.
Figure 11:
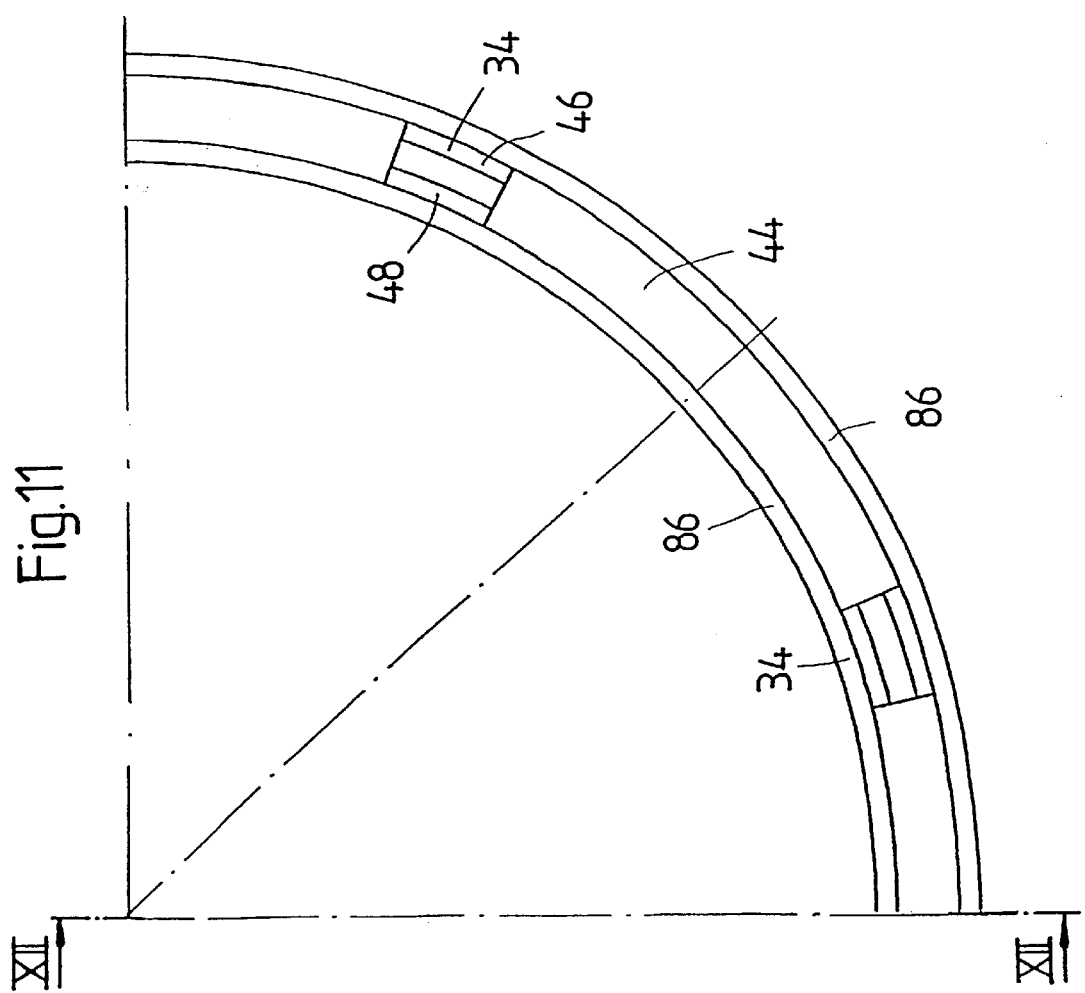
FIG. 11 shows different section of the cover element of FIG. 9.

The energy storage devices 36 provided in the torsional vibration damper 22 may comprise one piece between every two axial projections 49. However, a plurality of energy storage devices 36 may also be provided. Preferably, for a characteristic curve of frequently changing upward slope, a plurality of energy storage devices 36 of varying rigidity are used. The plurality of energy storage devices 36 are connected by intermediate elements 112, as shown in FIG. 8. The intermediate elements 112 may comprise cylinders 116 that have a radially larger middle section for separating two energy storage devices 36. Radially smaller end sections of the cylinders 116 engage into the adjacent energy storage devices 36. When these cylinders 116 are sufficiently large in the radial direction, they will rub against the cover element 30 on the radial outside during the deformation of the energy storage devices 36, especially under the effect of centrifugal forces. Therefore, the intermediate elements 112 may be used as a centrifugal-force-dependent friction device. Given a small radial embodiment of these cylinders 116, on the other hand, such friction is prevented. This would also be the case if, instead of the cylinders 116, balls 120 (see FIG. 8a) were arranged between the ends of the two adjacent energy storage devices 36.

FIGS. 9 through 12 show a different embodiment of the cover element 30, into which control elements 34 are placed from the open side 42. These control elements 34 have bendings 82, 84 in the radial direction that rest on the free ends 76, 78 of the cover element 30. The free ends 76, 78 act as stops 80 for the control elements 34. Preferably, the bendings 82, 84 comprise rings 86 which extend over the entire circumference of the cover element 30 and thus connect the individual control elements 34 to one another. In this way, the control elements 34 are positioned relative to one another.

The control elements 34 are embodied in a closed fashion to achieve the greatest possible rigidity on their side corresponding to the axial support 44 of the cover element 30. To ensure that sufficient axial space nonetheless remains available for the engagement of the axial projections 49 of the hub disk, each control elements 34 has a free space 70 for the axial projections 49. The free spaces are produced by providing an opening 72 in the axial support 44 into which a press-out 74 of the control element 30 is pressed. In addition to the advantage provided by this measure, the control elements 34 are secured against rotation inside the cover element 30.

Functioning as described above, the radial projections 46 and 48 running substantially parallel to the radial supports 38 and 40 also act to control the energy storage devices 36 with these cover elements 34 of FIGS. 9 through 12.

The embodiment of the cover element in FIGS. 13 to 16 is based on substantially the same principle as the embodiments in FIGS. 9 to 12. However, the individual control elements 34 are connected to one another by a ring 87, which runs radially centrally between the radial supports 38 and 40 of the cover element 30 in an opening 72 in the axial support 44. At each point where a control element 34 is provided, the ring 87 is interrupted for connecting to the control element 34 in the circumferential direction. The ring 87 obtains stability by being pressed into a press-out 91 in the axial support 44 of the cover element 30. In this way, the desired free space 70 is also created for the penetration of the associated axial projection 49 of the hub disk 26.

Figure 20:
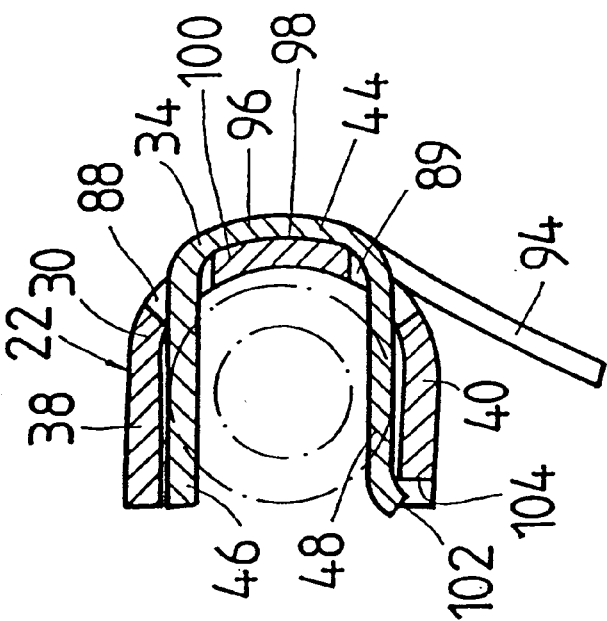
FIG. 20 shows another embodiment of the cover element with the positive-locking connection embodied at the free end of the control element.

FIG. 17 shows a different embodiment of the cover element 30, in which the control elements 34 are inserted from the turbine-wheel side. Specifically, the radial projections 46 and 48 are inserted through recesses 88, 89 in the axial support 44 until a cross-connection 96 between the projections 46 and 48 comes to rest on a connecting piece 100, which is provided radially between the recesses 88 and 89 on the axial support 44. The cross-connection 96 of the control elements 34 are attached to the turbine wheel 5 by supports 94. Cross connection 96 thus acts as an axial stop 98 for the cover element 30. In a design of this type, the cover element 30 and the control element 34 may also comprise a welded seam 90 located axially between the connecting piece 100 and the cross-connection 96, as shown in FIG. 18. However, a positive lock such as that in FIGS. 19 and 20 may also be used for the connection. According to FIG. 19, the outer radial support 38 of the cover element 30 has an opening 104, into which a shoulder 102 of the control element 34 is radially pressed. Similarly, in FIG. 20, the projection 48 of the control element 34 adjacent to the inner radial support 40 of the cover element 30 can be used as a radial press-in, for which reason the aforementioned radial support 40 is shorter than the outer radial support 38 in the same area.

Figure 21:
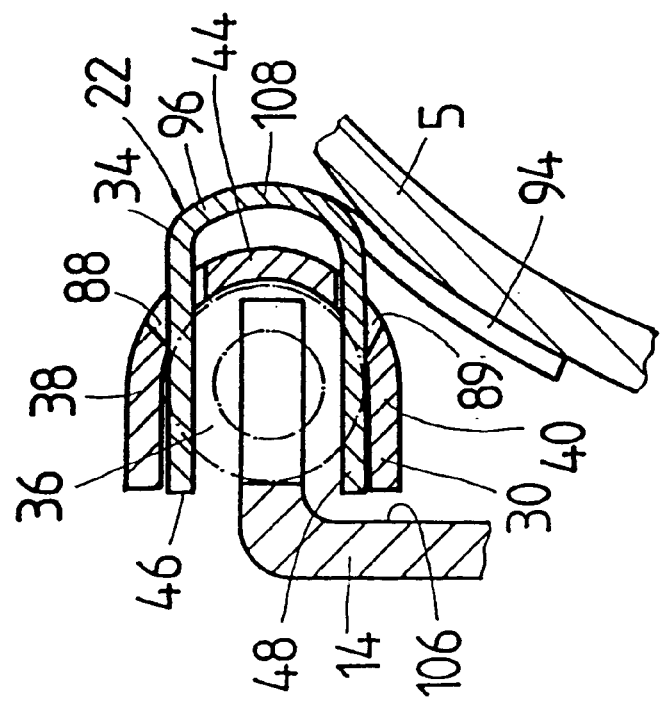
FIG. 21 shows another embodiment arrangement of the cover element with axial mobility relative to the control element.

In FIG. 21, the cover element 30 is not attached to the control element 34, which itself is secured to the turbine wheel 5 by means of the supports 94. In this embodiment, mobility of the cover element 30 relative to the control element 34 is allowed. The cross-connection 96 between the projections 46 and 48 of the control element 34 hereby acts as the turbine wheel side stop 108, while the associated side of the hub disk 26 or the corresponding side of the piston 14 (as FIG. 21 shows) acts as the stop 106. An axial movement of the cover element 30 occurs between these two stops 106 and 108, specifically, as a result of the movement of the piston 14.

In FIG. 22, which otherwise shows an embodiment of the cover element 30 and the control element 34 identical to that in FIG. 18, a piston 14 is shaped with a right-angle bend for permitting the cover element 30 and control elements 34 to be arranged as far radially outside as possible. This arrangement allows, with high torque transmissibility, the use of long-stroked energy storage devices of low rigidity, so that the torsional vibration damper 22 is suitable for filtering out very low frequencies.

FIG. 23 shows an embodiment in which the cover element 30 comprises only a ring 110, which acts as the outer radial support 38 and can thus absorb the centrifugal forces that occur at speed on the energy storage devices 36. Attached to the inner side of this ring 100 are control elements 34, which have projections 46, 48. The inner radial support 40 is formed in the area of the inner projections 48 by means of suitable dividing and radially inward pressing. Although its stability is less than that of the outer radial support 38, its load due to centrifugal force is also substantially lower. As a result, the cover element 30 according to the invention may be realized with the least possible technical expense.

Figure 24:
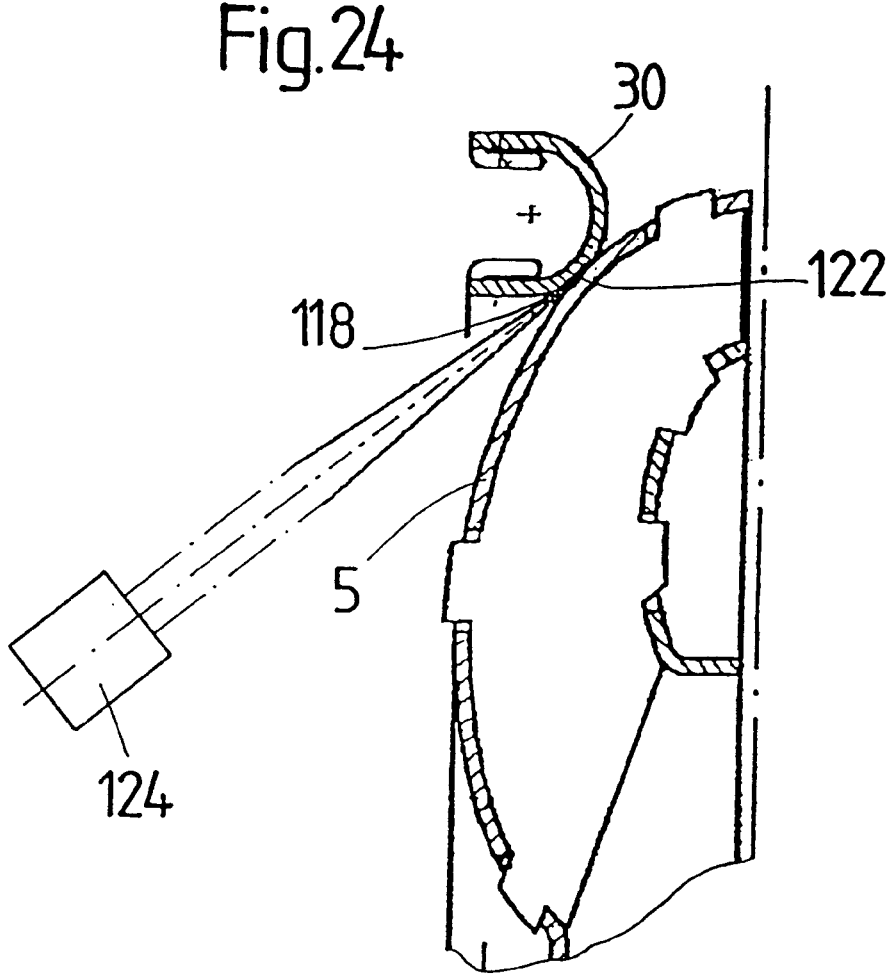
FIG. 24 shows a connection of the cover element to the turbine wheel.

As FIG. 24 shows, the cover element 30, due to its curvature on the side facing the turbine wheel 5 as well as to the curvature of the latter, comes to rest on the turbine wheel 5 along a contact line 122 that runs around the rotational axis 114 (see FIG. 1). Radially inside this line 122, the gap between the cover element 30 and the turbine wheel 5 undergoes a curvature-related expansion. This embodiment of the gap produces a focus 118 radially inside the aforementioned contact line 122 for a laser beam emitted by a laser welding device 124, shown schematically in FIG. 24. This ensures that the cover element 30 is welded only in the region of its contact line 122, but is welded there in all cases to the turbine wheel 5. The size of the heated weld area is therefore reduced to a minimum, so that retardation phenomena rarely occur on the turbine wheel 5 and/or the cover element 30 and, even with respect to possible heat treatment, no disadvantages are to be expected for at least one of these components.

Figure 25:
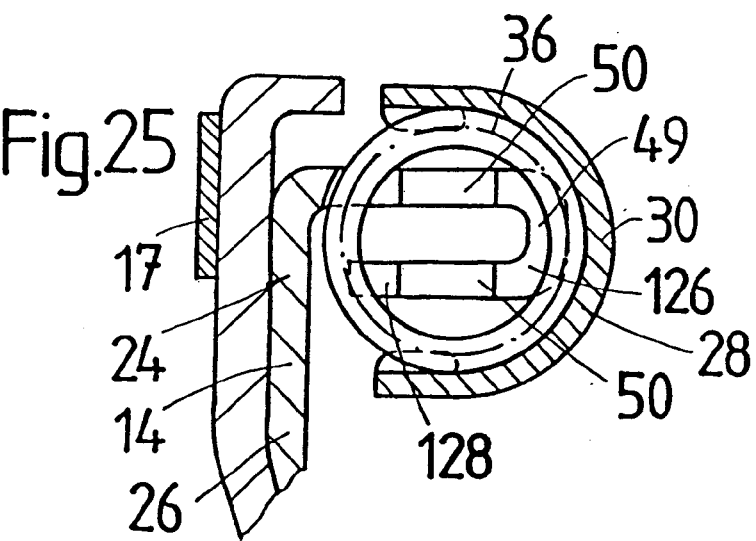
FIG. 25 shows a hub disk with an axial component having an additional bend.

As FIG. 25 shows, a different embodiment is conceivable for the hub disk 26 that acts as the output side component. In this embodiment, each axial projection 49 of the hub disk 26 is equipped, at the point of maximum penetration depth into the output side component 28 (the cover element 30), with a bend 126. A free end 128 of the axial projection 49 is bent so that it is directed back toward the substantially radial part of the hub disk 26. The bending 126 is preferably designed so that the free end 128 runs substantially parallel to the axial projection 49. Like the axial projection 49, the free end 128 carries at least one axial securing device 50 for an energy storage device 36, whereby the energy storage device 36, due to the form of the hub disk 26, can be pressurized over an especially large area. Such an embodiment of the hub disk 26 is therefore especially advantageous in energy storage devices 36 having a large diameter.

The invention is not limited by the embodiments described above which are presented as examples only but can be modified in various ways within the scope of protection defined by the appended patent claims.

We claim:

1. A lockup clutch for a torque converter, wherein the torque converter comprises a converter housing rotatably mounted about an axis of rotation, an impeller rotatably fixedly connected to the converter housing, and a turbine wheel rotatably mounted about the axis of rotation between the impeller and the converter cover, said lockup clutch comprising:

an axially deflectable piston having a friction surface on a radially outer area of a side facing the converter housing and rotatably mounted about the axis of rotation between the turbine wheel and the converter housing, wherein said axially deflectable piston is axially movable between a first position, whereat said friction surface frictionally contacts the converter housing so that a torque is transmitted from the converter housing to said axially deflectable piston when said converter housing is rotated, and a second position, whereat said friction surface is pulled away from frictional contact with the converter housing;

a torsional vibration damper having an input element connected to said axially deflectable piston and an output element connected to said turbine wheel, wherein one of said input element and said output element comprises a cover element having an open side facing another of the input element and the output element and inner and outer radial supports having free ends facing said open side, connected ends on a side facing away from said open side, and an axial support connecting said connected ends;

said another element comprising an axial penetration element extending along an axial projection direction and penetrating between said inner and outer radial supports; and an energy storage device accommodated in said cover element between said inner and outer radial supports; wherein one of said inner and outer radial supports comprises a control element between said open side and said axial support having an extension length extending radially into said cover element at a sufficient depth such that said energy storage device rests substantially on the entire extension length of said control element and such that said control element is free from contact with said axial penetration element.

2. The lockup clutch of claim 1, wherein said control element comprises a projection having a free end extending from said open side toward said axial support without cover the axial support where the axial penetration engages.

3. The lockup clutch of claim 2, wherein said projection comprises a bracket protruding originally on said open side relative to said radial supports, wherein said bracket is bent from their original position for obtaining an orientation relative to the adjacent radial support with an extension direction substantially parallel thereto.

4. The lockup clutch of claim 3, said free ends are arranged in a position where said radial supports transition into the radial support.

5. The lockup clutch of claim 1, further comprising formed elements arranged on the inner radial support on its end corresponding to the open side of the cover element that are bent toward the turbine wheel and are attached thereto.

6. The lockup clutch of claim 1, wherein said one of said input element and said output comprising said cover element comprises an extension directed toward and engaging a recess in said another of said input element and said output element with a predetermine circumferential clearance in the circumferential direction between said extension and said recess.

7. The lockup clutch of claim 1, wherein said control element is insertable into the cover element from said open side and has a free space for said another of said input element and said output element that engages an opening in the axial support of the cover element.

8. The lockup clutch of claim 7, wherein said free space comprises a press-out into said opening of said cover element.

9. The lockup clutch of claim 7, wherein said control element comprises a stop limiting an insertion depth into said cover element.

10. The lockup clutch of claim 9, wherein said stops comprise bent portions on said free ends which abut said open side of said cover element.

11. The lockup clutch of claim 9, wherein said stops comprise ring portions connecting said control elements to one another in the circumferential direction.

12. The lockup clutch of claim 1, wherein said axial support comprises recesses and said projections of said control elements are inserted through said recesses from the side of said cover element facing said turbine wheel.

13. The lockup clutch of claim 12, wherein each said control element comprises a support element bent toward the turbine wheel and attached thereto.

14. The lockup clutch of claim 12, wherein said projections of said control elements run substantially parallel to said inner and outer radial supports of said cover element.

15. The lockup clutch of claim 1, wherein said projections of said control elements run substantially parallel to said inner and outer radial supports of said cover element.

16. The lockup clutch of claim 12, wherein control elements further comprise a cross connection connecting said projections, said cross connection abutting said axial stop element of said cover element.

17. The lockup clutch of claim 12, wherein said control element is fixedly connected to said cover element in a material-locking fashion.

18. The lockup clutch of claim 12, wherein one of said projections of said control element comprises a shoulder projecting toward an adjacent one of said inner and outer radial supports of said cover element and engages a corresponding opening in said adjacent radial support in a positive-locking manner.

19. The lockup clutch of claim 12, wherein said cover element is axially movable relative to said control element until reaching an axial stop, wherein said axial stop comprises at least one of said piston, said input element, and a cross connection connecting said projections of said control element.

20. The lockup clutch of claim 1, wherein said cover element comprises an outer radial support comprising a ring having an inner diameter with said control elements arranged thereon, said projections of said control elements form said inner radial support.

21. The lockup clutch of claim 1, wherein said another one of said input element and said output element comprises a hub disk connected to said axially deflectable piston.

22. The lockup clutch of claim 1, wherein an outer circumferential area of said axially deflectable piston comprises a substantially axial collar.

23. The lockup clutch of claim 1, wherein said torsional vibration damper comprises a plurality of energy storage devices circumferentially connected by intermediate elements.

24. The lockup clutch of claim 23, wherein said intermediate elements comprise cylinders centered on circumferential ends of said energy storage devices.

25. The lockup clutch of claim 23, wherein said intermediate elements comprise balls centered on circumferential ends of said energy storage devices.

26. The lockup clutch of claim 1, wherein said cover element is positioned at an obtuse angle relative to the turbine wheel and said cover element is attached to the turbine wheel by laser welding at the point of contact.

27. The lockup clutch of claim 26, wherein said obtuse angle between said cover element and the turbine forms a focus for a laser beam for said laser welding.

28. The lockup clutch of claim 1, wherein said axial penetrating element comprises a free end having a bend of a predetermined angle.

29. The lockup clutch of claim 28, wherein said bend comprises a course substantially parallel to said axial projection direction in the extension area of said energy storage device.

* * * * *